US011486166B2

(12) United States Patent
Gwillim et al.

(10) Patent No.: US 11,486,166 B2
(45) Date of Patent: Nov. 1, 2022

(54) HIGH SECURITY MULTI-TIERED LOCKING SYSTEM FOR UTILITY VAULTS (71) Applicant: CHANNELL COMMERCIAL CORPORATION, Temecula, CA (US)

(72) Inventors: Robert H. Gwillim, Murrieta, CA (US); Edward J. Burke, Temecula, CA (US)

(73) Assignee: Channell Commercial Corporation, Temecula, CA (US)

( * ) Notice: Subject to any disclaimer, the term of this patent is extended or adjusted under 35 U.S.C. 154(b) by 301 days.

(21) Appl. No.: 16/844,874

(22) Filed: Apr. 9, 2020

(65) Prior Publication Data
US 2020/0362596 A1    Nov. 19, 2020

Related U.S. Application Data (60) Provisional application No. 62/848,756, filed on May 16, 2019.

(51) Int. Cl.
E05B 65/00     (2006.01)
E05B 67/38     (2006.01)
(Continued)

(52) U.S. Cl.
CPC .......... E05B 65/0089 (2013.01); B65D 55/14 (2013.01); E05B 59/00 (2013.01); E05B 65/006 (2013.01); E05B 67/383 (2013.01)

(58) Field of Classification Search
CPC ... Y10T 70/493; Y10T 70/496; Y10T 70/498; Y10T 70/554; Y10T 70/5544; Y10T 70/5549; Y10T 70/5553; Y10T 70/5558; Y10T 70/5562; Y10T 70/5566; Y10T 70/5571; Y10T 70/5575; Y10T 70/558;
(Continued)

(56) References Cited

U.S. PATENT DOCUMENTS 1,542,900 A * 6/1925 Maddocks .......... E02D 29/1427
                                                    49/465
3,490,637 A * 1/1970 Pope .................... E05B 65/006
                                                    220/325
(Continued)

FOREIGN PATENT DOCUMENTS

EP      3 088 456 A2    11/2016
KR    1020020023102 A    3/2002

OTHER PUBLICATIONS

International Search Report and Written Opinion issued in parallel International Application No. PCT/US2020/029605, dated Jul. 27, 2020, 14 pages.
(Continued)

Primary Examiner — Lloyd A Gall
(74) Attorney, Agent, or Firm — Lewis Roca Rothgerber Christie LLP (57) ABSTRACT A locking system for a utility vault including an I-beam extending across an opening in utility vault, a two-piece lid positioned in the opening over the I-beam, brackets positioned on opposite ends of each piece of the two-piece utility lid for engaging an inside wall surface of the utility vault and the I-beam, and a three-tier locking system positioned at an end of one piece of the two-piece lid to lock the lid to the vault including a L-bolt lock, a padlock and a lockable door on an upper surface of the lid.

16 Claims, 8 Drawing Sheets (51) Int. Cl.
 *E02D 29/14* (2006.01)
 *G02B 6/44* (2006.01)
 *H02G 9/10* (2006.01)
 *E05C 3/04* (2006.01)
 *B65D 55/14* (2006.01)
 *E05B 59/00* (2006.01)

(58) Field of Classification Search
 CPC ............ Y10T 70/5584; Y10T 70/5589; Y10T 70/5593; Y10T 70/5597; Y10T 70/5602; Y10T 70/5606; E05B 65/0089; E05B 59/00; E05B 65/006; E05B 67/383; E05B 67/38; E05B 2067/386; B65D 55/14; E02D 29/1427; G02B 6/4451; H02G 9/10; H02G 3/185; E05C 3/04
 USPC ............ 49/464, 465; 52/19, 20; 109/67, 68; 174/37, 39, 66, 67; 220/210, 259.2; 404/25, 26
 See application file for complete search history.

(56) References Cited

U.S. PATENT DOCUMENTS

| | | | |
|---|---|---|---|
| 3,672,103 A | 6/1972 | Kost | |
| 3,921,449 A * | 11/1975 | Hauffe | G01F 15/14 |
| | | | 49/35 |
| 4,113,291 A * | 9/1978 | Cameron | E05B 67/383 |
| | | | 292/281 |
| 4,142,329 A * | 3/1979 | Williams | E05B 65/006 |
| | | | 49/465 |
| 6,616,371 B2 * | 9/2003 | Pate | E02D 29/14 |
| | | | 137/364 |
| 7,547,051 B2 * | 6/2009 | Burke | G02B 6/4451 |
| | | | 292/195 |
| 8,245,619 B2 * | 8/2012 | Hall | B29C 70/30 |
| | | | 52/309.1 |
| 9,890,566 B1 | 2/2018 | Davidson | |
| 10,265,890 B2 * | 4/2019 | Burke | B32B 27/06 |
| 10,358,285 B2 * | 7/2019 | Burke | B32B 17/04 |
| 2004/0194991 A1 | 10/2004 | Hutchin et al. | |
| 2006/0201213 A1 | 9/2006 | Burke et al. | |
| 2009/0200056 A1 | 8/2009 | Moran | |
| 2010/0180505 A1 | 7/2010 | Sordo et al. | |
| 2010/0206019 A1 * | 8/2010 | Burke | E05B 35/008 |
| | | | 70/162 |
| 2012/0079968 A1 * | 4/2012 | von Bereghy | E04H 9/029 |
| | | | 109/1 S |
| 2014/0083146 A1 | 3/2014 | Ousley | |
| 2014/0196380 A1 | 7/2014 | Burke | |
| 2021/0107364 A1 * | 4/2021 | Collins | E05B 65/006 |
| 2021/0332617 A1 * | 10/2021 | Burke | E05B 35/008 |

OTHER PUBLICATIONS

Korean Office action for Patent Application No. 10-2020-0055238, dated Oct. 29, 2021, 10 pages.
Australian Examination Report for Application No. 2020202811, dated May 14, 2021, 5 pages.
European Search Report issued in parallel European Application No. 20173153.6-1201, dated Sep. 29, 2020, 10 pages.

* cited by examiner

HIGH SECURITY MULTI-TIERED LOCKING SYSTEM FOR UTILITY VAULTS

CROSS-REFERENCE TO RELATED APPLICATION(S)

This application claims the benefit of and priority to U.S. Provisional Application No. 62/848,756, filed May 16, 2019, the contents of which are incorporated herein by reference.

BACKGROUND OF THE INVENTION

This invention relates to a locking system useful in closing and locking the lid of enclosures such as grade level boxes and more particularly to a high security locking system which provides a three-tier locking system for a two-piece lid of a grade level utility vault.

Grade level utility vaults are used to contain various high cost equipment such as cable TV equipment, data transmission lines, telephone switching equipment, service lines, power transmission devices, and water meters for example. Consequently, it is highly desirable to protect such devices from tampering. Previously, single tier locking systems have been incorporated to lock a lid to a utility vault which provides a limited amount of protection from tampering with the equipment contained therein. Consequently, it is highly desirable to provide a multiple tier locking system as a means of locking an enclosure to prevent tampering with the equipment contained within the utility vault.

SUMMARY OF THE INVENTION

The present invention is directed to a multiple tier high security locking system for locking a lid to a grade level utility vault to prevent tampering with the equipment contained therein. The present invention also has application to other types of ground level enclosures and similar enclosures generally.

The multi-tier locking system of the present invention includes an I-beam spanning an opening of a utility vault which is attached to the vault by a bracket attached to opposite inside walls of the utility vault. The bracket has a flange on either side of the I-beam having a hole for receipt of a hairpin clip which extends through the hole in the flanges and a hole in the I-beam. The bottom of the clip engages a lower surface of the beam. A similar bracket having flanges and a hairpin clip would attach the opposite end of I-beam on the other side of the utility vault. A lid for the utility vault is positioned within the opening of the vault such that it rests on its perimeter along a ledge around the perimeter of the inside walls of the vault. The lid is a two-piece construction having a non-locking portion and a locking portion. A bracket is positioned along a lower surface of an end of the non-locking portion of the lid such that when the lid is slid over to engage an end wall of the vault, the bracket has a flange which slides underneath a lip of the end wall to engage the end wall. The bracket is attached to the non-locking portion of the lid by conventional fasteners. The opposite end of the non-locking portion of the lid also has a bracket fastened to an underside of the lid which has a lower portion that rests on an upper surface of the I-beam.

A locking portion of the lid also has a bracket attached to its lower surface and is inserted into the opening in the vault next to the non-locking portion such that the bracket engages a lower surface of a top portion of the I-beam. An edge portion of the locking portion of the lid rests on an upper surface of the flange portion of the bracket for the non-locking portion of the lid which in combination with the bracket holds the non-locking portion of the lid down on the opening of the vault.

An opposite end of the locking portion of the lid includes an L-bolt locking assembly which when rotated will engage a flange along an end wall of a utility vault to lock the locking portion of the lid and hence the entire lid to the vault. An access door is position on the top of the locking portion of the lid which can be opened by rotating a bolt to move a tab thereby allowing the hinged door to be raised to access a padlock. A padlock is positioned within the opening which engages access doors having hasps. One of the access doors has an opening providing access to a toggle for rotating the L-bolt. Once the padlock engages the hasps, the access door can be closed and locked.

The multi-tier locking system of the present invention includes insertion of the I-beam, securing the I-beam with hairpin clips, placing the non-locking lid on the vault and sliding the non-locking lid to an end of the vault to engage a hook portion of the bracket under the ledge. The non-locking lid has a second bracket which extends over the I-beam and the lockable lid has Z-brackets that hooks under a flange of the I-beam holding an end of the lockable lid portion down. An end of the lockable lid sits on top of the bracket of the non-locking lid thereby holding it down. The locking lid portion includes the L-bolt locking mechanism which is then lowered into position on the utility vault. A lock box has a quarter turn security lock to secure the cover which is then opened to access a high security padlock. The padlock engages inner cover plates having hasps which must be removed in order to turn the elbow locking mechanism in order to release its engagement with the utility vault thereby providing high security locking engagement of the utility vault. These and other aspects of the invention will be more fully understood by reference to the detailed description and the accompanied drawings.

DETAILED DESCRIPTION

Figure 1:
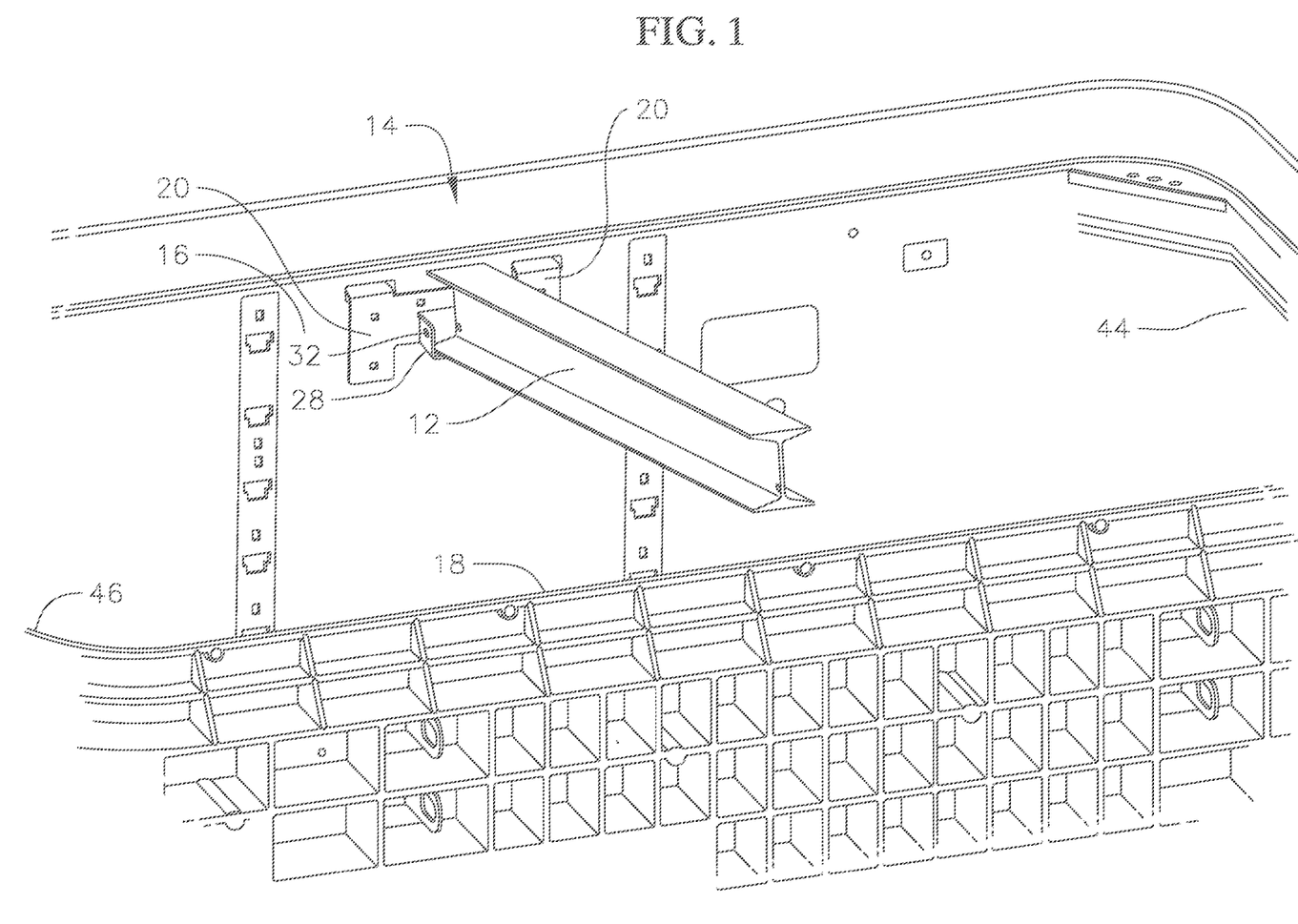
FIG. 1 is a partial perspective view of an opening of a utility vault of the present invention.
Figure 2:
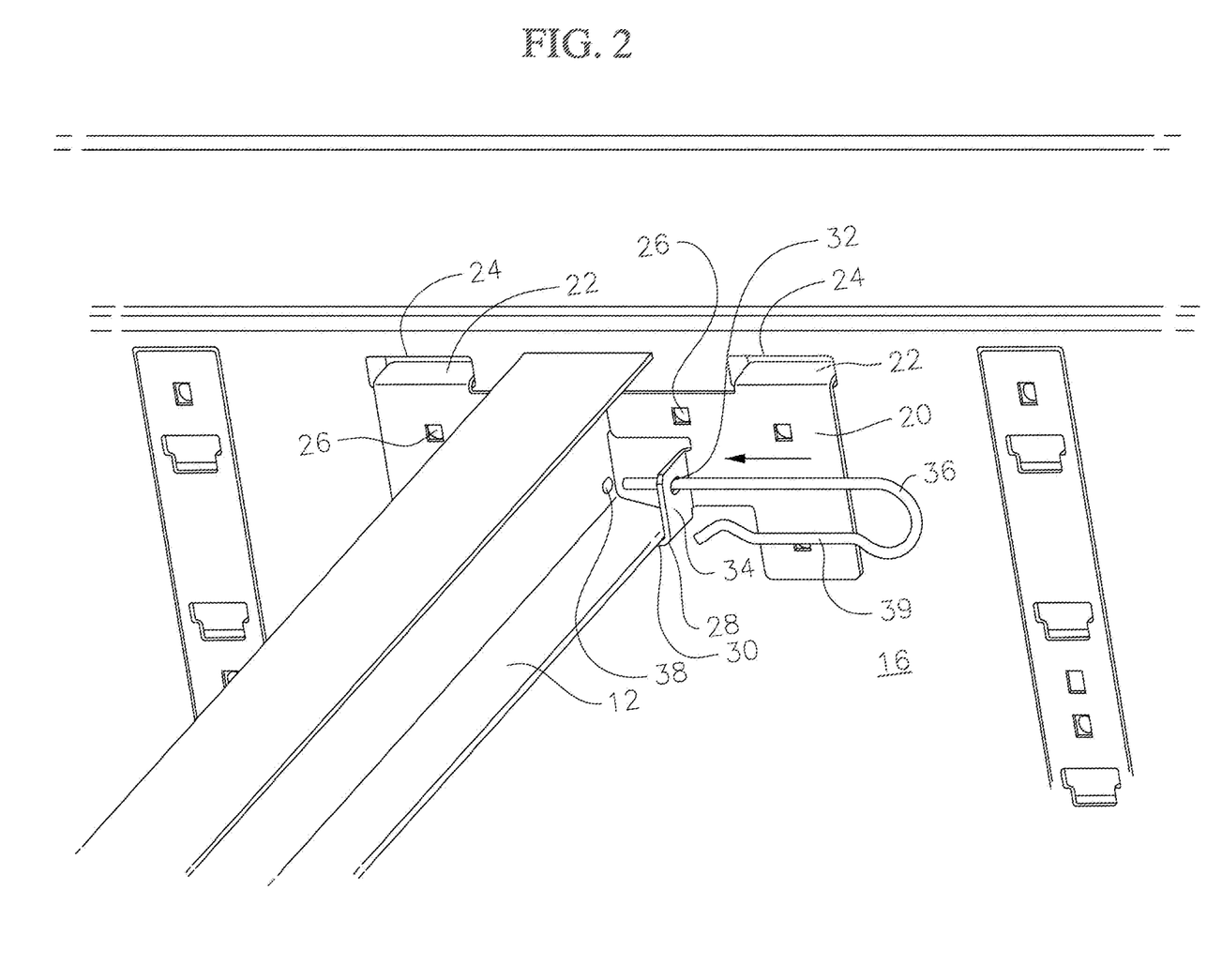
FIG. 2 is a detail view of FIG. 1.

Referring to the drawings, FIG. 1 illustrates a utility vault 10 having an interior for receipt of various equipment not shown. Unintended tampering of the equipment within the utility vault is preventing by incorporating a locking system for attaching a lid to the utility vault. The locking system includes an I-beam 12 which spans an opening 14 in the vault by extending from a side wall 16 to an opposite side wall 18 and is attached to side walls 16, 18 by a bracket 20 positioned on either side wall. As also seen in FIG. 2, bracket 20 is attached to side wall 16 by flanges 22 which extend into openings 24 in the side wall. Bracket 20 also has a number of openings 26 for receipt of fasteners to secure the bracket to the side wall. The bracket 20 also includes an L-shaped flange 28 located on either side of the beam extending perpendicularly inwardly into the interior of the utility vault for receipt of a lower surface of the I-beam 12. The I-beam 12 rests on a lower leg 30 of the L-shaped flange 28. Flange 28 also has a hole 32 positioned in the upright portion 34 of the flange for receipt of a hairpin clip 36 which also extends through a hole 38 in the I-beam to rigidly attach the I-beam 12 to the bracket 20. Bottom portion 39 of the clip 36 also engages the lower surface of the beam. A similar bracket 20 having flanges and a hairpin clip would attach to the opposite side wall 18 and the opposite end of the !-beam 12 on the other side of the utility vault.

Figure 3:
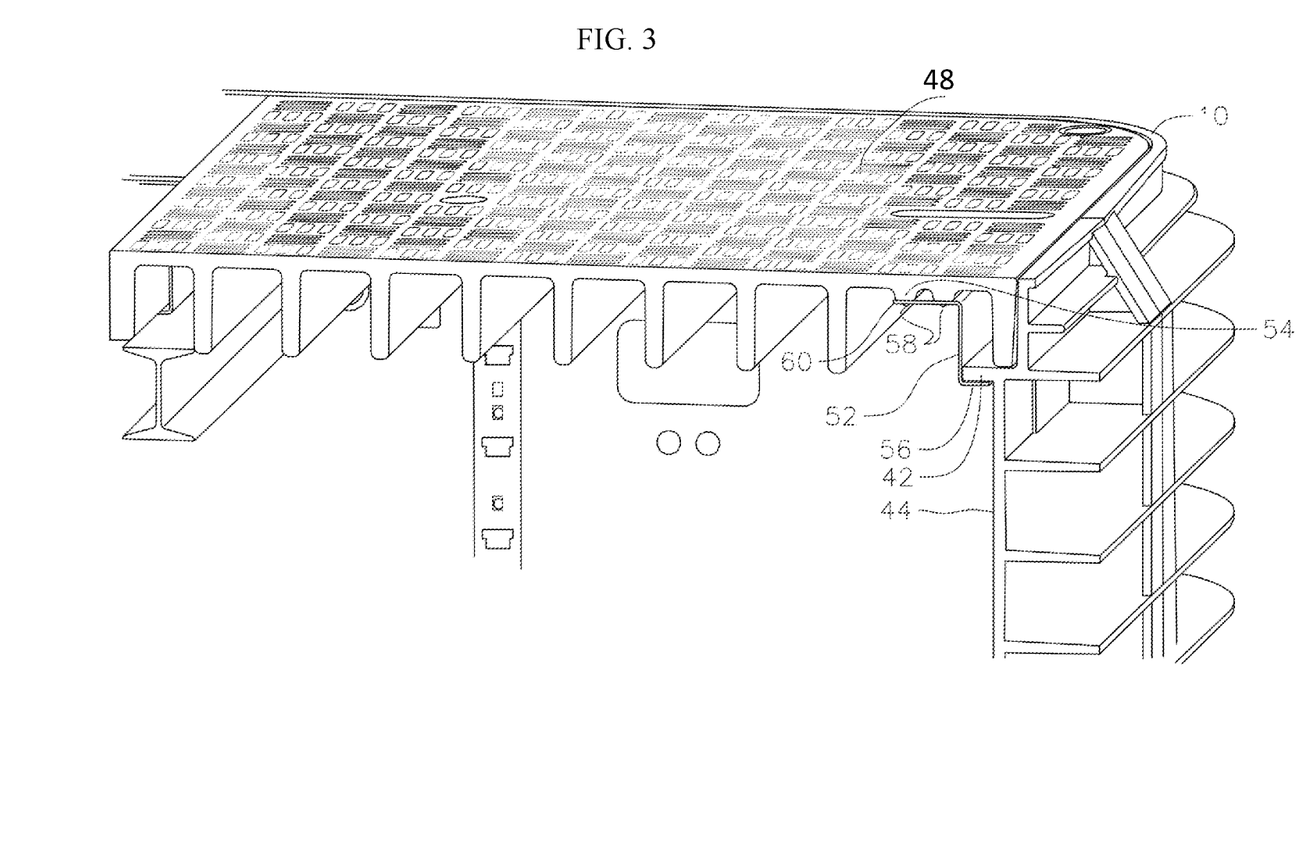
FIG. 3 is a detail cross-sectional perspective view of a first end of the utility vault of FIG. 1 having a lid.
Figure 4:
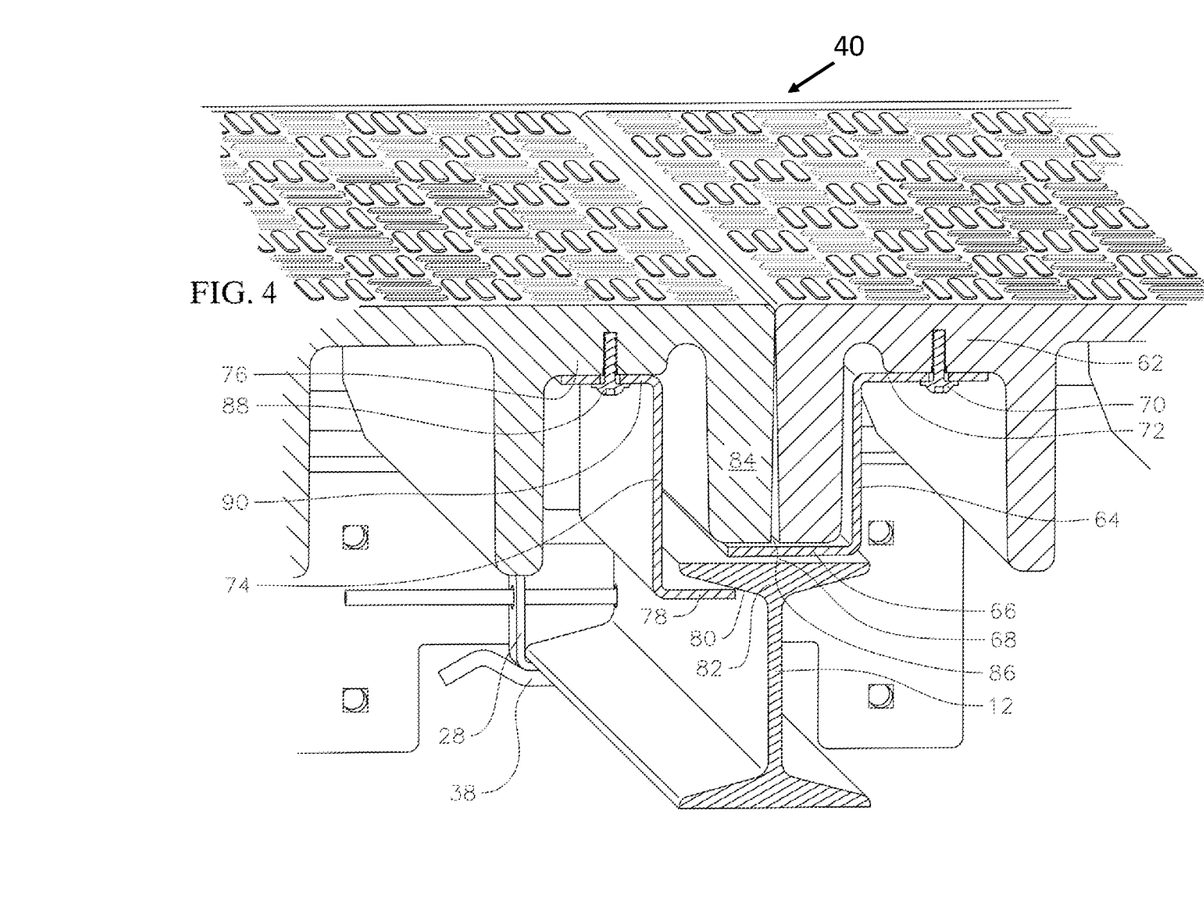
FIG. 4 is a detail view of FIG. 1 incorporating a two-piece lid.

As shown in FIG. 3, a lid 40 for the utility vault 10 is positioned within the opening 14 of the vault such that it rests along a ledge 42 extending around a perimeter of the inside portion of the vault along side walls 16, 18 and end walls 44, 46. Lid 40 has a two-piece construction having a non-locking portion 48 and a locking portion 50 as shown in FIG. 4. As shown in FIG. 3, a bracket 52 is positioned along a lower surface of an end portion 54 of the non-locking portion 48 of the lid such that when the lid is slid over to engage end wall 44, the bracket 52 has a perpendicular flange 56 which slides underneath the ledge 42 to engage end wall 44. The bracket 52 is attached to the end portion 54 by conventional fasteners 58 extending through a top perpendicular wall 60 of the bracket. Flange 56 of bracket 58 retains the non-locking portion 48 of the lid to the utility vault.

As shown in FIG. 4, an opposite end portion 62 of the non-locking portion 48 of the lid also has a bracket 64 fastened to an underside of the opposite end portion 62 and has a flange 66 that rests on an upper surface 68 of the I-beam 12. The bracket 64 is attached to opposite end portion 62 by fasteners 70 extending through holes in a top perpendicular wall 72 of the bracket 64.

The locking portion 50 of the lid also has a bracket 74 attached to an end portion 76 along a lower surface which has a flange 78 that engages a lower surface 80 of the I-beam 12 when the locking portion of the lid is inserted into the opening of the vault next to the non-locking portion 48 such that the flange 78 engages the lower surface 80 of a top portion 82 of the I-beam. An edge rim 84 of the locking portion 50 of the lid rests on an upper surface 86 of the flange 66 of bracket 64 which in combination with bracket 52 holds the non-locking portion 48 of the lid down on the opening 14 of the vault 10. Bracket 74 is attached to end portion 76 by fasteners 88 extending through a top perpendicular wall 90 of bracket 74.

Figure 5:
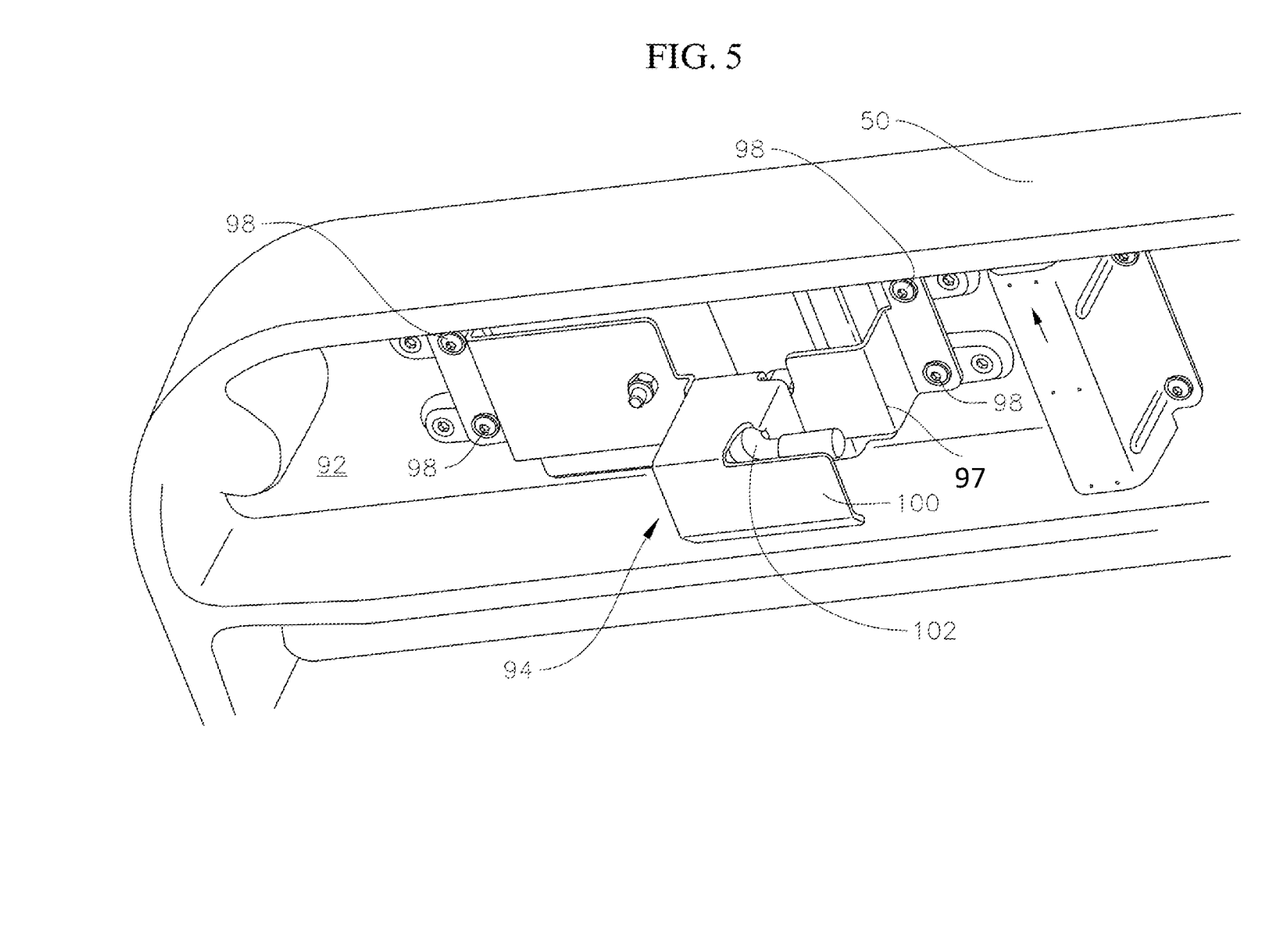
FIG. 5 is a detail view of the latch assembly attached to a lower surface of the lid.
Figure 6:
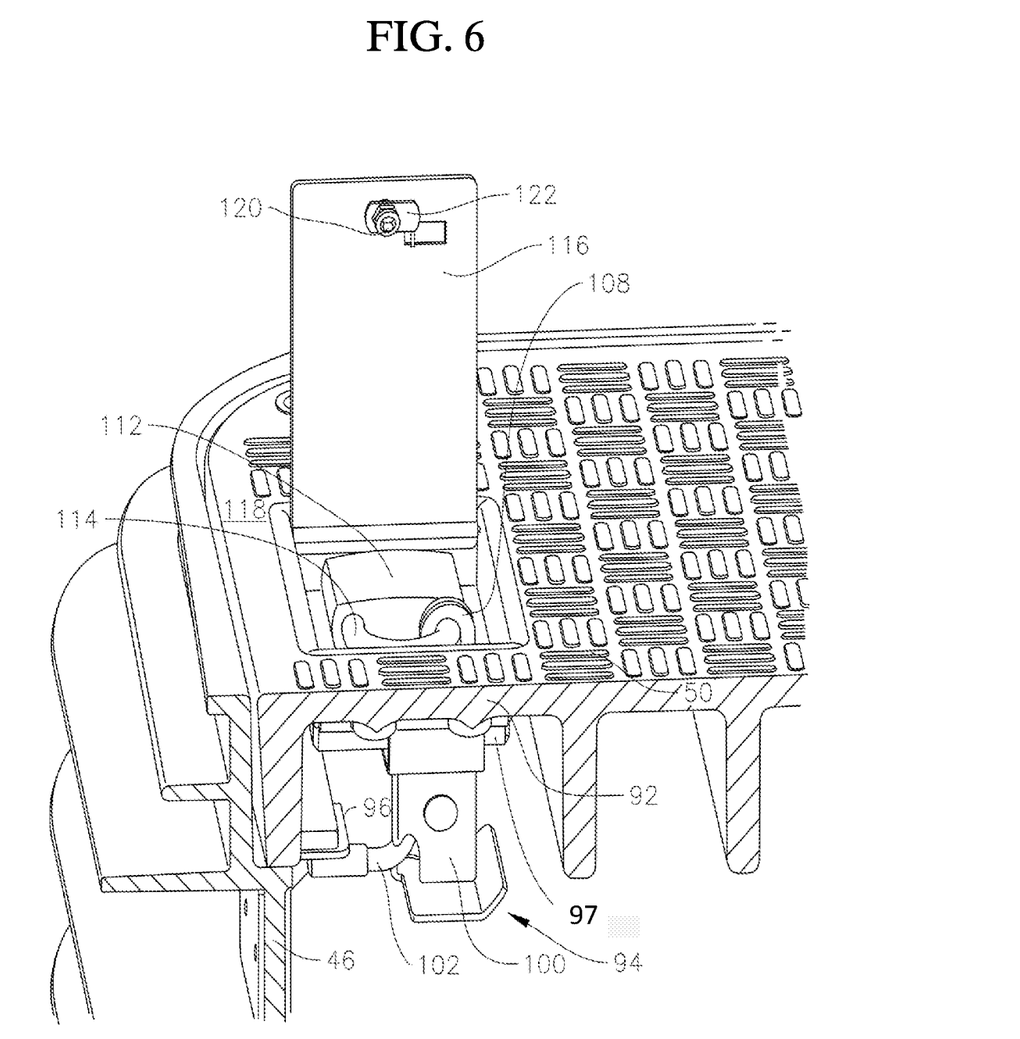
FIG. 6 is a cross-sectional detail partial perspective view of FIG. 5.
Figure 7:
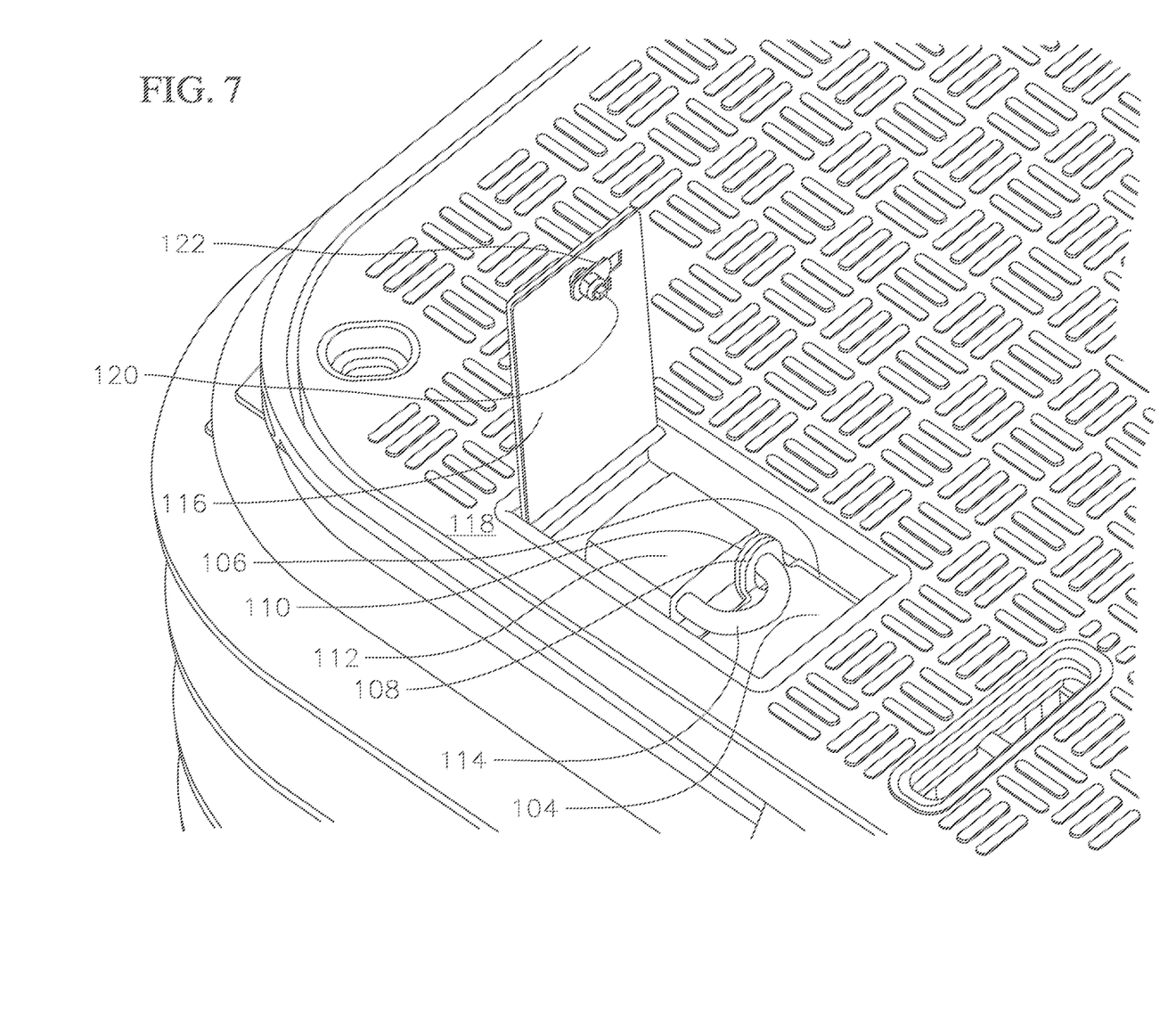
FIG. 7 is a detail partial perspective view of the latch from a top surface of the lid.
Figure 8:
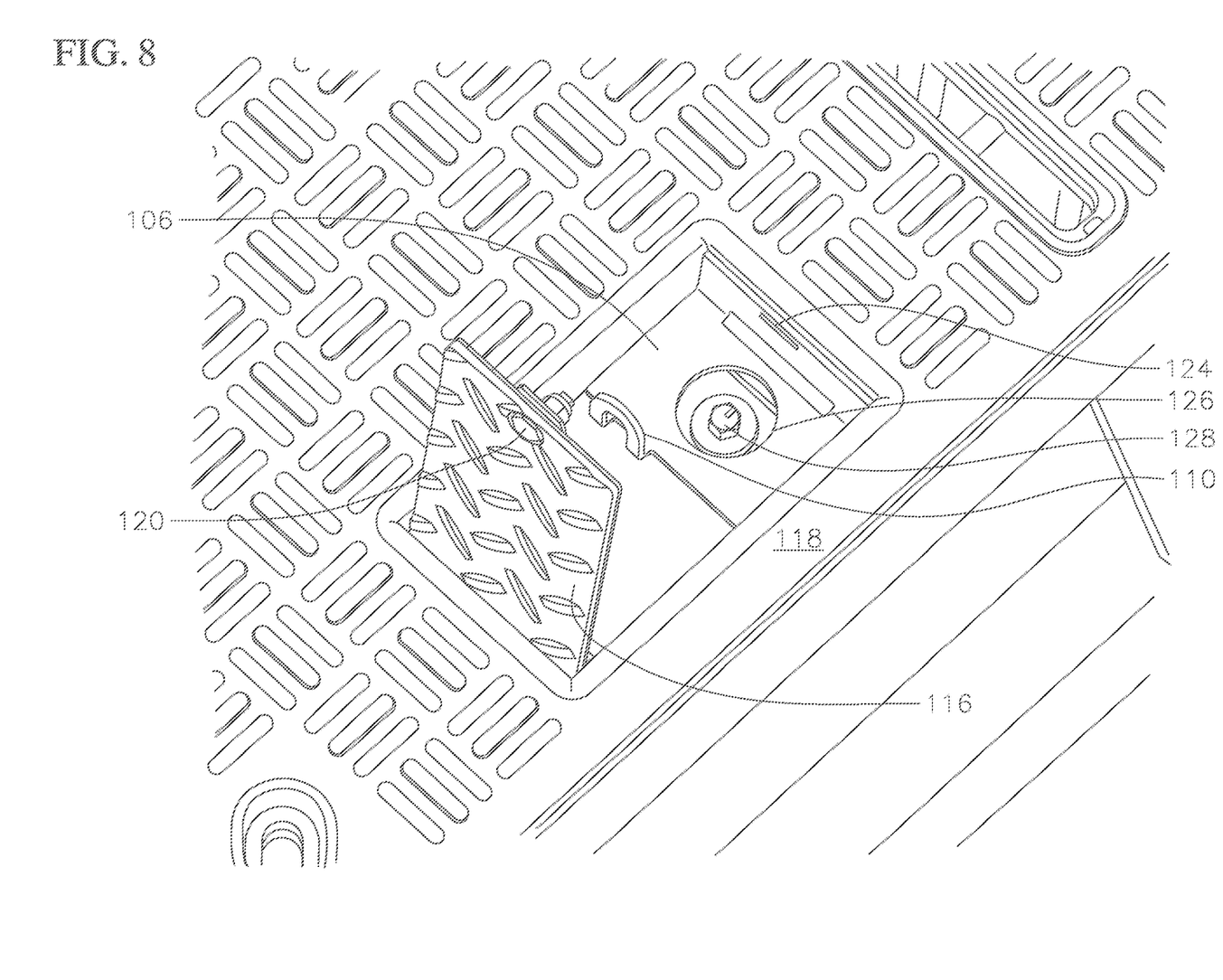
FIG. 8 is a detail view of FIG. 7 with the padlock removed.

As shown in FIGS. 5 and 6, an opposite end 92 of locking portion 50 of the lid includes an L-bolt locking assembly 94 which when rotated will engage a flange 96 attached to end wall 46 of the vault to lock the locking portion 50 of the lid to the vault. The construction and operation of the L-bolt assembly 94 is similar to that disclosed in Applicant's U.S. Pat. No. 7,547,051, the contents of which are incorporated herein by reference. The L-bolt assembly 94 includes a housing 97 that is attached to the lower surface of the locking portion 50 by fasteners 98. Housing 97 includes a guard portion 100 to protect the L-bolt 102 and provide room for rotating into and out of the locking position. As also seen in FIGS. 7 and 8, the housing 97 includes access doors 104 and 106 each having a hasp 108, 110 respectively.

Hasps 108 and 110 are locked in position by a padlock 112 by being engaged by a clasp 114 of the padlock.

A hinged access door 116 is positioned on the top surface 118 of the locking portion of the lid which can be opened by rotating a bolt 120 to move a tab 122 to disengage from slot 124 in the housing 96 thereby allowing the hinged access door 116 to be raised to access the padlock 112. The padlock can then be unlocked by a key to remove the clasp from the hasps which allows access door 104 to be removed uncovering opening 126 in access door 106 which provides access to toggle 128 for rotating L-bolt 102 to disengage flange 96.

The high security locking system of the present invention provides three tiers of locking protection. The locking system is for a two-piece construction lid for the utility vault, however a single piece construction lid can also incorporate the principles of the present invention. The locking system includes insertion of a I-beam within the vault and securing the I-beam with hairpin clips and then placing the non-locking portion of the lid on the vault and sliding the lid to an end to engage the bracket under the ledge of the vault. The non-locking lid portion has a second bracket that extends over the I-beam and the lockable lid portion has brackets that engage under a flange of the I-beam holding an end of the lockable lid portion down. An end of the lockable lid portion sits on the top of the bracket of the non-locking lid portion thereby holding it down. The locking lid portion includes the L-bolt locking mechanism which is then lowered into position on the utility vault. A lock box has a quarter turn security lock to secure the locking lid portion which is then opened to access the high security padlock. The padlock engages inner cover plates having hasps which much be removed in order to turn the L-bolt locking mechanism in order to release its engagement with the utility vault thereby providing high security locking engagement to the utility vault.

Although the present invention has been described and illustrated with specific embodiments thereof, it is to be understood that changes and modifications can be made therein which are within the full intended scope of the invention as hereinafter claimed.

What is claimed is:

1. A locking system for locking a lid onto a utility vault comprising:
   a housing attached to a lower surface of an end of the lid;
   the housing containing an L-bolt rotatable by a toggle to selectively engage a flange attached to an end wall of the utility vault;
   the housing further having access doors positioned over the toggle each having a hasp for receipt of a padlock, one of the access doors having an opening for access to the toggle; and
   a lockable hinged door positioned within an opening extending through an upper surface of the lid for access to the padlock.

2. The locking system of claim 1, wherein one of the access doors is positioned over the other access door and is movable for access to the access door having the opening for the toggle.

3. The locking system of claim 1, wherein the lid has a two-piece construction having a lockable portion and a non-lockable portion.

4. The locking system of claim 3, wherein the housing is attached to the lockable portion.

5. The locking system of claim 3, wherein the locking system further comprises a beam extending across an opening in the utility vault.

6. The locking system of claim 5, wherein adjacent ends of the lockable portion of the lid and the non-lockable portion of the lid are positioned over the beam.

7. The locking system of claim 6, wherein the adjacent ends each have a bracket for engaging the beam.

8. A locking system for a utility vault comprising:
an I-beam extending across an opening in the utility vault;
a two-piece lid positioned in the opening over the I-beam;
a bracket positioned on at least one end of each piece of the two-piece lid for engaging at least one of an inside wall surface of the utility vault or the I-beam; and
a housing attached to an end of one piece of the two-piece lid, the housing containing an L-bolt rotatable by a toggle to selectively engage a flange attached to an end wall of the utility vault, the housing further having access doors positioned over the toggle each having a hasp for receipt of a padlock, one of the access doors having an opening for access to the toggle, and a lockable hinged door positioned within an opening extending through an upper surface of the one piece of the two-piece lid for access to the padlock.

9. The locking system of claim 8, wherein one of the access doors is positioned over the other access door and is movable for access to the access door having the opening for the toggle.

10. The locking system of claim 8, wherein the two-piece lid includes a lockable portion and a non-lockable portion.

11. The locking system of claim 10, wherein the housing is attached to the lockable portion.

12. A lockable utility vault comprising:
a utility vault having a top opening and a ledge extending around an inside perimeter of the top opening;
a beam extending across the top opening below the ledge;
a two-piece lid positioned within the top opening over the ledge;
the two-piece lid having a lockable portion and a non-lockable portion wherein adjacent ends of the lockable portion and the non-lockable portion each have a bracket for engaging the beam; and
a housing positioned on an end of the lockable portion opposite the end adjacent the non-lockable portion;
wherein the housing contains an L-bolt rotatable by a toggle to selectively engage a flange attached to an end wall of the utility vault, the housing further having access doors positioned over the toggle each having a hasp for receipt of a padlock, one of the access doors having opening for access to the toggle, and a lockable hinged door positioned within an opening extending through an upper surface of the lockable portion of the lid for access to the padlock.

13. The utility vault of claim 12, wherein the beam is attached to the utility vault by a bracket positioned on opposite side walls of the utility vault, the bracket having a flange positioned on either side of the beam having a hole for receipt of a clip which passes through the hole in each flange and an aligned hole in the beam.

14. The utility vault of claim 12, wherein one of the access doors is positioned over the other access door and is movable for access to the access door having the opening for the toggle.

15. The utility vault of claim 12, wherein the non-lockable portion has a bracket and an end opposite the end adjacent the lockable portion for engaging the ledge along an end wall of the utility vault.

16. The utility vault of claim 12, wherein the beam is an I-beam and the bracket for the non-lockable portion of the lid engages a top surface of the I-beam and the bracket for the lockable portion of the lid engages a bottom surface of a top portion of the I-beam.

* * * * *